United States Patent [19]
Ichimura et al.

[11] Patent Number: 5,906,653
[45] Date of Patent: May 25, 1999

[54] NAVIGATION SYSTEM AND GYROSCOPIC DEVICE

[75] Inventors: Atsushi Ichimura; Masatsugu Kamimura; Jyunichi Yamamoto, all of Kobe, Japan

[73] Assignee: Fujitsu Ten Limited, Hyogo, Japan

[21] Appl. No.: 08/753,698

[22] Filed: Nov. 27, 1996

[30] Foreign Application Priority Data

Dec. 1, 1995 [JP] Japan .................................. 7-314536
Dec. 1, 1995 [JP] Japan .................................. 7-314537

[51] Int. Cl.⁶ .................................................. G06F 165/00
[52] U.S. Cl. ........................ 701/207; 701/208; 701/210; 701/221
[58] Field of Search ................................ 701/200, 201, 701/202, 206, 207, 208, 209, 210, 212, 215–216, 221; 340/988, 990, 995; 73/178 R

[56] References Cited

U.S. PATENT DOCUMENTS

| 4,660,037 | 4/1987 | Nakamura | 701/200 |
| 4,903,212 | 2/1990 | Yokouchi et al. | 701/216 |
| 5,113,185 | 5/1992 | Ichikawa | 701/212 |
| 5,317,515 | 5/1994 | Matsuzaki | 701/221 |

FOREIGN PATENT DOCUMENTS

| 2-38916 | 2/1990 | Japan . |
| 3-23490 | 1/1991 | Japan . |
| 3-95407 | 4/1991 | Japan . |
| 3-144309 | 6/1991 | Japan . |
| 3-191812 | 8/1991 | Japan . |
| 4-235310 | 8/1992 | Japan . |
| 4-295714 | 10/1992 | Japan . |
| 7-218276 | 8/1995 | Japan . |

*Primary Examiner*—William A. Cuchlinski, Jr.
*Assistant Examiner*—Gertrude Arthur
*Attorney, Agent, or Firm*—Wenderoth, Lind & Ponack, L.L.P.

[57] ABSTRACT

A processing apparatus within a navigation system comprises a track calculating portion for subsequently memorizing a bearing detected by a bearing sensor to calculate a track, and a map match processing portion for performing the map matching process. A position correcting portion corrects a vehicle position onto a road in accordance with road data 35 by the map match processing portion 34. The bearing correction is not effected when the bearing difference conditions are established although a bearing correcting portion 39 corrects the bearing showing the progressive direction of the vehicle into the link bearing of the road. The bearing difference condition is a condition where the bearing difference between the link bearing and the bearing showing the progressive direction of the vehicle is large, and there is a possibility of further increasing the error when the error of the bearing showing the progressive direction of the vehicle is large and the correction is effected in the link bearing. The offset correction can be carried out precisely with proper timing when a gyroscopic device is used as the bearing sensor.

12 Claims, 15 Drawing Sheets

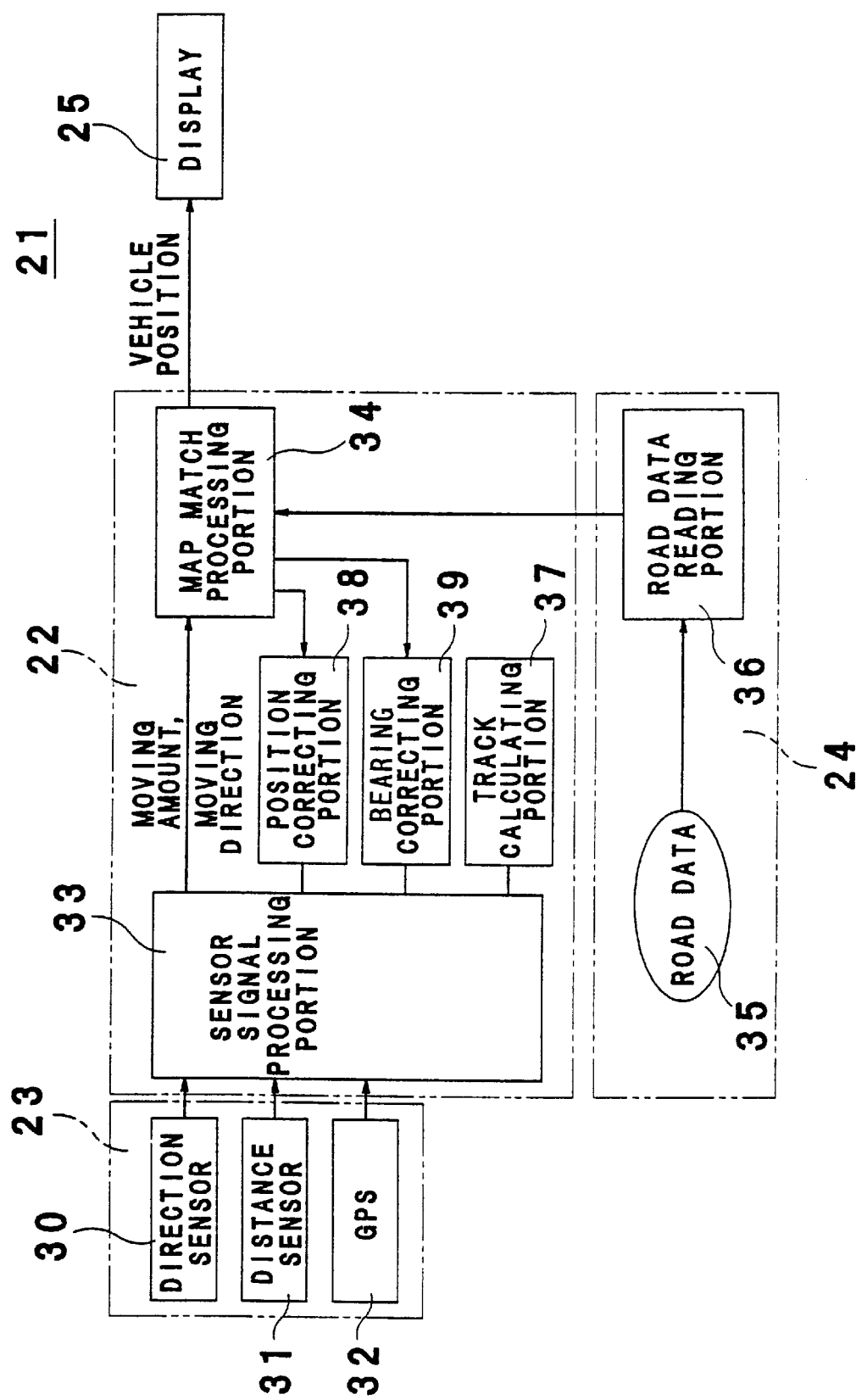

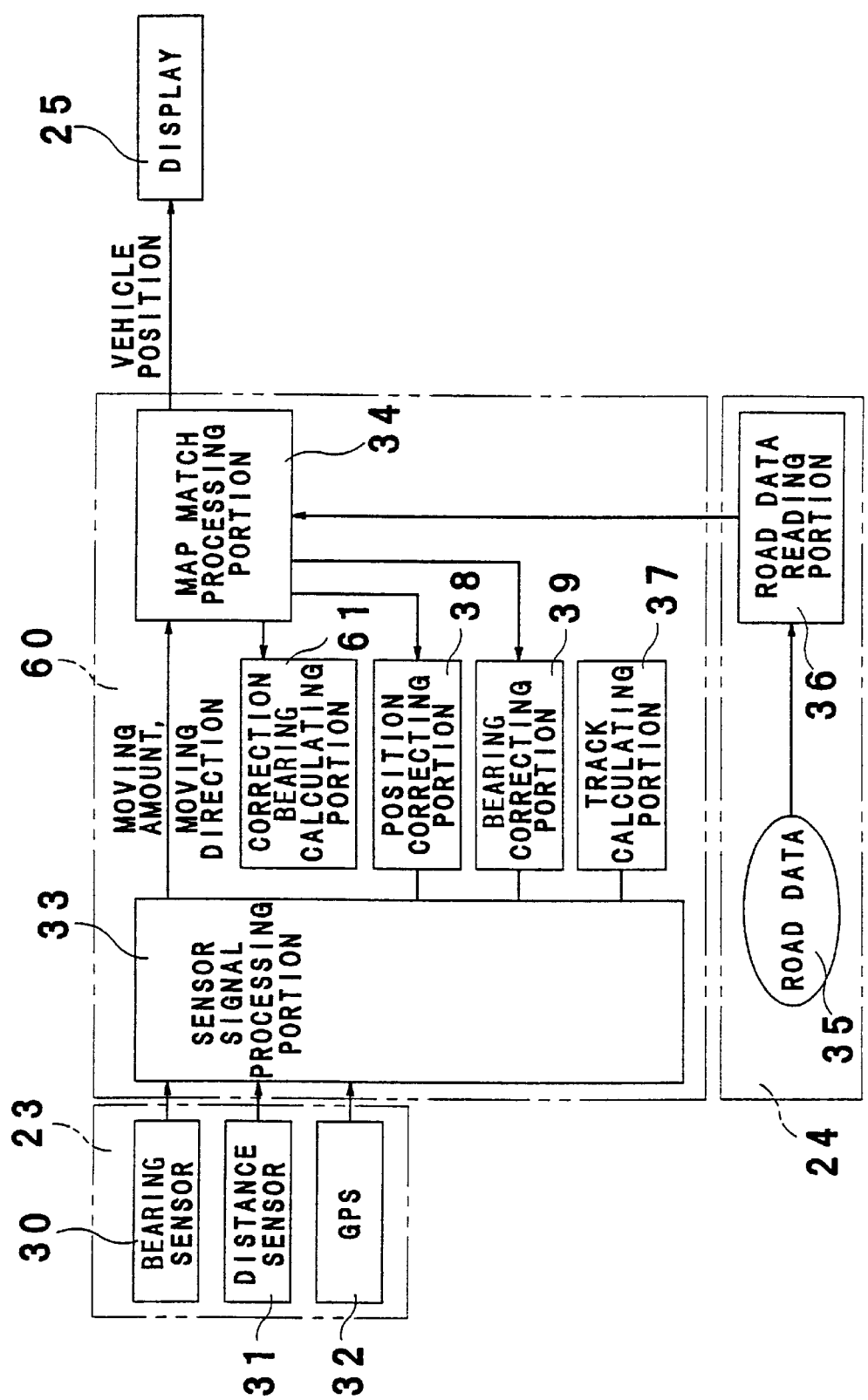

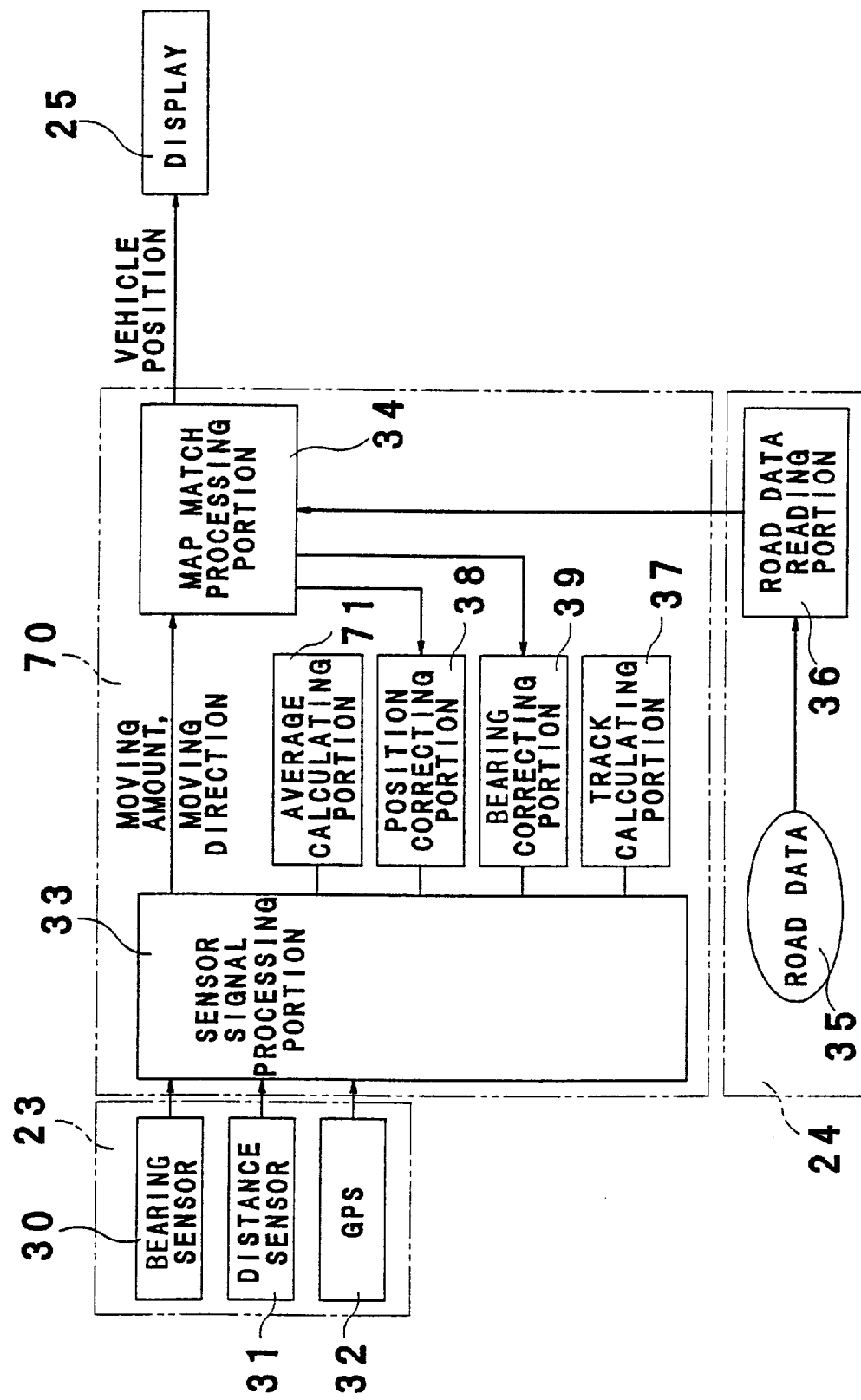

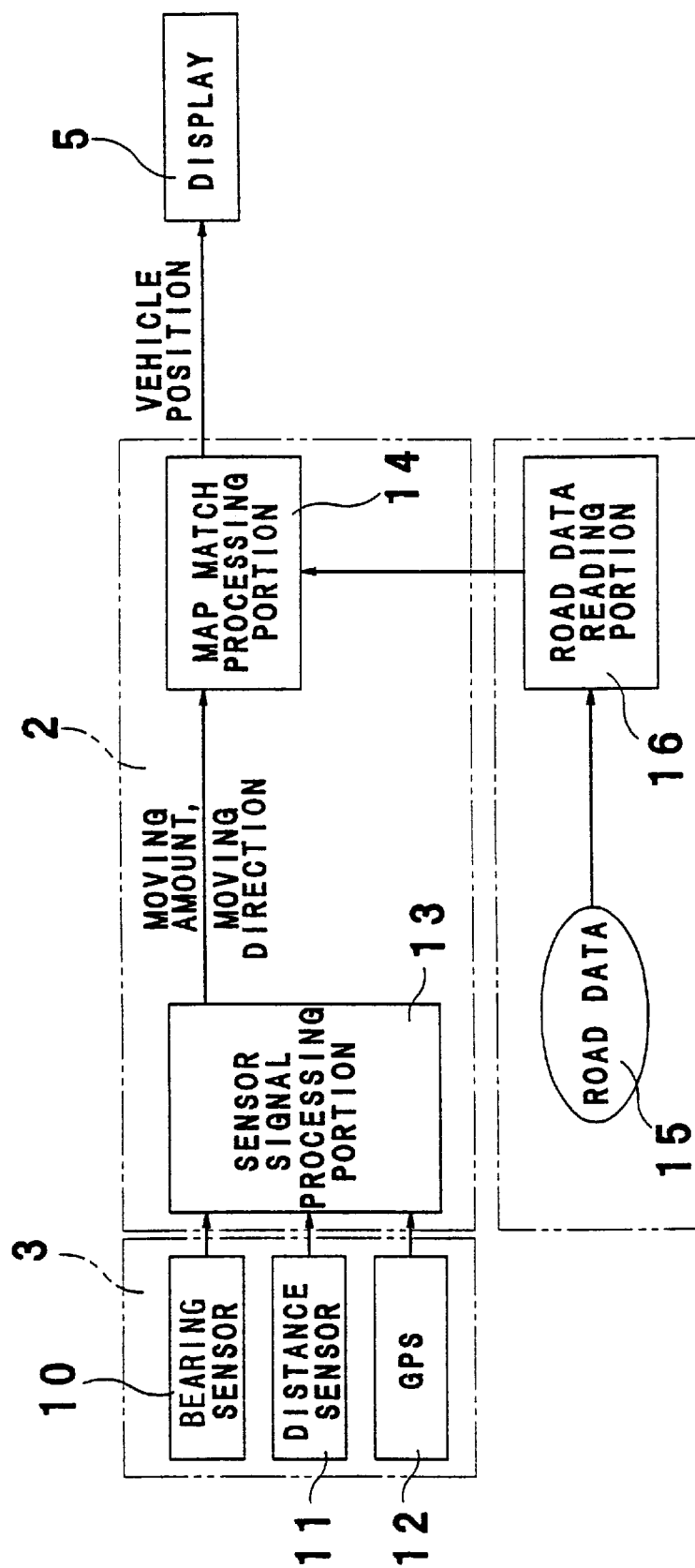

NAVIGATION SYSTEM AND GYROSCOPIC DEVICE

BACKGROUND OF THE INVENTION

1. Field of the Invention

The present invention relates to a navigation system mounted on a vehicle for providing support to a vehicle driver such as route guide for the vehicle driver, and to a gyroscopic device which is used in the navigation system, or similar systems, as bearing detecting means for detecting changes in progress direction.

2. Description of the Related Art

Such a navigation system 1 of which hardware construction is shown in FIG. 14 is conventionally mounted on the vehicle. A processing apparatus 2 of the navigation system 1 detects the present position of the vehicle on the basis of the information detected by a sensor 3, and then a present position of the vehicle is displayed on a display 5 on the basis of the data stored in a storage apparatus 4. A mass storage apparatus having a replaceable recording medium, such as a CD-ROM or an IC card, or a stationary mass storage apparatus, such as a hard disk, is used as the storage apparatus 4. A CRT, LCD, or the like is used as the display 5. The processing apparatus 2 includes a CPU 6, a main memory 7, and the like. The main memory 7 includes a RAM and a ROM, wherein the ROM stores preset programs. The navigation system 1 is capable of detecting an absolute position and an absolute bearing of the vehicle by receiving electric wave signals from an artificial satellite 8 constituting a GPS (Global Positioning System).

FIG. 15 shows a functional construction of the navigation system 1 of FIG. 14. The sensor 3 includes a bearing sensor 10 for detecting a moving direction of the vehicle, a distance sensor 11 for detecting a distance traveled by the vehicle, a GPS apparatus 12 for detecting the absolute position and the absolute bearing by receiving electric waves from the artificial satellite 8 of the GPS. The signals detected by the sensor 3 are processed by a sensor signal processing portion 13, realized by the program operation of the CPU 6, as signals representing the moving amount and the moving direction of the vehicle. A map matching process, wherein the vehicle position is applied on a road which is read from road data 15 through a road data reading portion 16 in accordance with the moving amount and the moving direction from the sensor signal processing portion 13, is effected in a map match processing portion 14 which is realized by the program operation of the CPU 6. In the road data 15, roads are stored with successive formation of the links among straight line sections. The vehicle position presumed on the road by the map match processing portion 14 is displayed on the display 5 of a display apparatus or similar device.

In the detection of the absolute position and the absolute bearing by the GPS apparatus 12, the present position and the progress direction of the vehicle are presumed by a self-supporting navigation based on detection signals from the bearing sensor 10 and the distance sensor 11 realized by a vibration gyro and the like. This is because comparatively large errors may be included in the detected absolute position and absolute bearing even if these could be anyhow detected due to the fact that the receiving condition of the electric waves from the artificial satellite 8 is not always satisfactory. In the estimation of the vehicle bearing by the self-supporting navigation, since changes in the running direction of the vehicle are accumulated by a vibration gyro, measurement errors of the vibration gyro and the like are accumulated, which causes a deterioration in the reliability of the bearing detection. The vehicle direction and position presumed by the self-supporting navigation is corrected on the basis of the absolute position and absolute bearing detected by the GPS apparatus 12, or is corrected by conducting feedback of the corrected vehicle position or the link bearing which is the bearing of the road during the map matching process to the road by the map match processing portion 14. Also, a method wherein the current running position of the vehicle is directly inputted, thereby to correct the vehicle position, is also in use.

In the conventional navigation system, the position and progress direction of the vehicle can be detected by plural methods to make up for the loss of the respective methods. For example, Japanese Unexamined Patent Publication JP-A 3-23490 discloses a prior art relating to a detection of the progress direction of a vehicle as an absolute bearing, by means of an earth magnetic sensor and a GPS apparatus, to detect the abnormality of output data from the earth magnetic sensor.

Also, in the navigation system, as described above, both a method of presuming a relative present position by the self-supporting navigation on the basis of a change in a running direction and a running distance of the vehicle and a method of absolutely detecting the present position and progress direction of the vehicle by the GPS are used. The condition of receiving the electric waves in the GPS is not always good, and errors in the absolute position and the absolute bearing sometimes become large even when they are detectable. To detect the relative bearing, a gyroscopic device using a vibration gyro and so on is preferably used, and bearing detection is always enabled. The bearing detection using the gyro sensor is effected by multiplying the difference between an output value of the gyro sensor and a gyro offset value which is outputted when the rotation is not given in the running direction of the vehicle, by a gyro sensitivity coefficient, and then by integrating the result. However, since the offset value changes with time due to temperature drifts or the like, proper correction is required. This is particularly the case at the time of starting since deviations by several ten degrees in five minutes may be caused.

The prior art concerning the correction with respect to the temperature drift or the like of the gyro sensor is disclosed in Japanese Unexamined Patent Publication JP-A 3-95407, Japanese Unexamined Patent Publication JP-A 4-235310, Japanese Unexamined Patent Publication JP-A 7-218276 and the like. The Japanese Unexamined Patent Publication JP-A 3-95407 discloses an art of offset correction considering the amount of change on the assumption that the drift component changes successively with time. Japanese Unexamined Patent Publication JP-A 4-235310 discloses an art of calculating a necessary offset value in a short time by increasing the sampling frequency for calculating the offset correction value at the time of a temperature rise of the apparatus. Japanese Unexamined Patent Publication JP-A 7-218276 discloses an art of avoiding a wrong correction in estimation of the correction amount for an offset bias amount during the stop of the vehicle to effect the offset correction.

In the case where the vehicle bearing is corrected with a combined use of plural methods such as a detection of an absolute bearing, map matching in the conventional navigation system, and the like, the following problems are encountered:

(1) When a link bearing and an absolute bearing of a map-matched road are largely different from each other, the feedback thereof is considered to be contradictory to each other. This is particularly the case when the map matching is erroneous, thus there is a possibility that the convergence on a correct bearing may be effected with great difficulties.

(2) When the vehicle bearing and link bearing obtained by the vibration gyro or the like are largely different from each other, there is a high possibility that the map matching is erroneous, and the error of the vehicle bearing potentially becomes larger in the case where correction to the link bearing obtained by the map matching is carried out.

(3) When the vehicle bearing and absolute bearing obtained by the vibration gyro or the like are largely different from each other, the error of the vehicle bearing is large, and there is a high possibility of presumption of a wrong road whether or not the map matching was effected. Accordingly there is a possibility that the error of the vehicle bearing does not converge when the bearing correction to link bearing is effected after the map matching.

(4) When the correction bearing by the absolute bearing and the correction bearing by the link bearing are the same in direction, there is a possibility that only the vehicle bearing is erroneous even when a bearing difference with respect to the vehicle bearing is large, and accordingly, there is a possibility of being late in convergence of the vehicle bearing in the case where the correction is not effected for a reason that the bearing difference with respect to the vehicle bearing is large.

(5) When the straight advance judgment or the like is effected using the vehicle bearing obtained by the vibration gyro, the dispersion of the bearing becomes large under the influences of the bearing correction, and accordingly, there is a possibility that the bearing data cannot be obtained even in the case of straight advance.

(6) When the bearing correction is effected by the absolute bearing and vehicle bearing, there is a possibility of effecting a wrong correction under the influence of an error component in the case where the correction is effected by only one sample value.

The gyroscopic device, such as a vibration gyro, is likely to generate a temperature drift caused by the rise in the atmospheric temperature due to heating of a gyro vibrator itself, and heating of peripheral circuits for signal processing, thus resulting in that the offset change becomes so large as it cannot be neglected when high precision is requested. Therefore, as described in the prior art of Japanese Unexamined Patent Publication JP-A 4-235310, even if an offset correction is effected in a short time immediately after the temperature rise of the apparatus, the subsequent temperature drifts cannot be prevented.

To correct the offset from the temperature drift, it is required to actually detect the offset component to effect proper offset correction. Generally, the detection of the offset value is effected during the stop time or in the straight advance time when the change in progress direction of the vehicle is smaller. However, when driving on a mountain road or a highway, since the vehicle continues running for a long time and a period when the vehicle advances straight is relatively short, the condition to effect the correction of the offset value is not satisfied for a long time, so that there is a possibility of the true offset value being largely different due to temperature drifts.

SUMMARY OF THE INVENTION

An object of the invention is to provide a navigation system capable of properly correcting a bearing by using a plurality of means for detecting the bearing. Another object of the present invention is to provide a gyroscopic device which is used as a bearing detecting means of the navigation system and capable of providing a proper off-set correction with precise accuracy.

The invention provides a navigation system mounted on a vehicle having a function of presuming a vehicle position and a bearing showing a progressive direction of the vehicle on the basis of a change in a running direction detected by a bearing detecting means and on the basis of a change of a running distance detected by a running distance detecting means, the navigation system comprises:

history calculating means for calculating a running history on the basis of the vehicle position and the bearing showing the progressive direction of the vehicle;

position correcting means for calculating similarity between the running history of the vehicle calculated by the history calculating means and road data stored in advance, to thereby correct the vehicle position on a road where the similarity is large;

bearing correcting means for correcting the bearing showing the progressive direction of the vehicle to a bearing of a road on which the vehicle position is corrected by the position correcting means, wherein the correction of the vehicle position by the position correcting means is carried out while correction of the bearing showing the progressive direction of the vehicle to the bearing of the road on which the vehicle position is corrected by the position correcting means is not carried out, when a predetermined bearing difference condition is established.

According to the invention, the running history of the vehicle is calculated by the use of the vehicle position and the bearing showing the progressive direction, and the vehicle position is corrected onto the road on the basis of the similarity between the running history and the road data. Since the bearing showing the progressive direction of the vehicle is not corrected into the bearing of the road when the predetermined bearing difference condition is established, such possibilities that the bearing showing the progressive direction of the vehicle is corrected by mistake and that the convergence to the right bearing may be delayed, are eliminated. Whereas, proper correction can be effected with respect to the bearing showing the progressive direction of the vehicle when the bearing difference condition is not established.

Namely, according to the invention, the proper correction can be effected by the prevention of an increase in bearing error, because when the predetermined bearing difference condition is established, the bearing showing the progressive bearing of the vehicle is not corrected into the road bearing while the vehicle position is being corrected onto the road.

Also, the invention is characterized in that the bearing correcting means has the predetermined bearing difference condition that a bearing difference between the bearing showing the progressive direction of the vehicle and a bearing of the road becomes a predetermined reference value or more.

According to the invention, since the bearing showing the progress direction of the vehicle is not corrected to the bearing of the road under the bearing difference condition where the bearing difference between the bearing showing the progressive direction of the vehicle and the bearing of the road becomes the predetermined reference value or more, the bearing correction under the condition where the difference in bearing is large and there is a possibility of large error, can be prevented.

Namely, according to the invention, a possibility of increasing the error by correcting the bearing showing the progressive direction of the vehicle can be avoided in the case where the estimation of the road position onto the road is likely to be wrong due to a large difference between the bearing showing the progressive direction of the vehicle and the bearing of the road.

In addition, the invention is characterized in that the navigation system further comprises an absolute bearing detecting means for detecting an absolute bearing showing the progressive direction of the vehicle, and that the bearing correcting means further corrects the bearing showing the progressive direction of the vehicle based on the absolute bearing detected by the absolute bearing detecting means, and the predetermined bearing difference condition is so defined that a bearing difference between the absolute bearing and a bearing of the road on which the vehicle position is corrected by the position correcting means becomes a predetermined reference value or more.

According to the invention, there is a possibility of having a large error in the bearing showing the vehicle position when the bearing difference between the absolute bearing and the bearing showing the vehicle position is large, and there is also a possibility of further increasing the error when the correction is effected to the road bearing in such a case. In the case like this, since the bearing correction is not effected, increase in error can be avoided.

Namely, according to the invention, when the bearing difference between the absolute bearing and the bearing showing the vehicle position is large which causes the possibility of large error in the bearing showing the progressive direction of the vehicle, the possibility of further increases in error caused by correcting the bearing to the road bearing can be avoided.

Also, the invention is characterized in that even when the bearing difference between the absolute bearing detected by the absolute bearing detecting means and the bearing of the road on which the vehicle position is corrected by the position correcting means becomes the predetermined reference value or more, when a first correcting direction for the bearing of the road on which the vehicle position is corrected by the position correcting means and a second correcting direction for the bearing based on the absolute bearing detected by the absolute bearing detecting means coincide, the bearing correcting means corrects the bearing of the progressive direction of the vehicle on the basis of a bearing correction value into the first correcting direction bearing and a bearing correction value into the second correcting direction.

According to the invention, when the bearings based on the absolute bearing and the road bearing, to which the progressive direction of the vehicle is corrected, coincide, the bearing representing the progressive direction of the vehicle is corrected because there is a large possibility that the bearing correction is more accurate in the case where the correction is carried out for the bearing showing the progressive direction of the vehicle.

Namely, according to the invention, even when the error may be large in the bearing showing the progressive direction of the vehicle, it can be corrected into a more correct bearing.

Also, the navigation system of the invention further comprises an absolute bearing detecting means for detecting an absolute bearing showing the progressive direction of the vehicle, and is characterized in that the bearing correcting means further corrects the bearing showing the progressive direction of the vehicle based on the absolute bearing detected by the absolute bearing detecting means, and that the predetermined bearing difference condition is so defined that the bearing difference between the absolute bearing and the presumed bearing showing the progressive direction becomes the predetermined reference value or more.

According to the invention, there is a possibility that the error of the bearing showing the progressive direction is large because the bearing difference between the absolute bearing and the bearing showing the progressive direction is large, and if the correction is effected to the bearing of the road which is presumed in accordance with such bearing having a large error, there is a possibility that the error may increase. The increase in the error of the bearing showing the progressive direction of the vehicle can be prevented because the bearing correction is not effected when the possibility to increase the error by conducting feedback of such road bearing is large.

Namely, according to the invention, the increase in the error can be avoided because the correction to the road bearing, which is presumed in accordance with the bearing showing the progressive direction of the vehicle, is not effected when there is a possibility that the error in the bearing showing the progressive direction of the vehicle is large.

In addition, the invention provides a navigation system comprising:

history storage means for sequentially capturing a bearing showing a progressive direction of a vehicle and storing a history of the bearing; and straight advance judging means for determining a straight advance when a change in bearing during a predetermined period is within a predetermined range, referring to the history storage means, wherein the correction bearing calculating means calculates a correction bearing, to which the bearing showing the progressive direction of the vehicle is to be corrected, separately from a bearing showing a presumed progressive direction when the straight advance is determined by the straight advance judging means.

According to the invention, the bearing showing the progress direction of the vehicle is captured sequentially to be memorized. Since the correction bearing for correcting the bearing showing the progressive direction is calculated separately from the correction of bearing, in judgment of the straight advance or the like, a possibility that the straight advance may not be detected by the large dispersion or bearings caused by the bearing correction can be avoided.

Namely, according to the invention, the straight advance judgment can be effected properly even when the bearing correction value is variable because the storage means can be referred to in judging the straight advance when the detection value of the bearing showing the progressive direction of the vehicle is stable.

Also, a navigation system of the invention further comprises an absolute bearing detecting means for detecting an absolute bearing showing a progressive direction of a vehicle, and is characterized in that the bearing correcting means corrects the bearing showing the progressive direction of the vehicle on the basis of an average bearing of the absolute bearing about a predetermined first period and an average bearing of the bearing showing the progressive direction of the vehicle about a predetermined second period, at the time when it corrects the bearing showing the progressive direction of the vehicle on the basis of the absolute bearing detected by the absolute bearing detecting means.

According to the invention, influences of errors such as noises generated in the correction by a single sampling can be eliminated because the correction is effected on the basis of the average bearing of the absolute bearing about a predetermined first means and the average bearing of the bearing showing the progressive direction of the vehicle about a predetermined second means when the correction of the bearing showing the progressive direction of the vehicle is effected on the basis of the absolute bearing.

Namely, according to the invention, an increase in errors due to noises or the like can be avoided because the bearing correction can be effected on the basis of the average bearing.

Further, the invention provides a gyroscopic device mounted on the vehicle for presuming the progressive direction of the vehicle during the running of the vehicle by detecting a change in the progressive direction of the vehicle by means of a gyro sensor, the gyroscopic device comprises:

clocking means for clocking a time elapsed;

offset detecting means for detecting offset components from an output of the gyro sensor under a predetermined condition where the progressive direction is judged as being stable;

correction value calculating means for calculating an offset correction value, the offset correction value being for correcting the offset components detected by the offset detecting means; and offset correcting means for correcting the output from the gyro sensor by using the offset correction value calculated by the correction value detecting means, wherein the offset correcting means makes a degree of the correction in a period from a starting-up of the power source to a predetermined time, larger than degrees of the correction in other periods, referring to the clocking means.

According to the invention, the offset detecting means detects the offset components under the predetermined condition where the progressive direction is judged as being stable from the output of the gyro sensor. The correction value calculating means calculates the offset correction value for correcting the offset components detected by the offset detecting means. The offset correcting means uses the offset correction value calculated by the correction value calculating means with reference to the clocking means, and makes the degree of the correction in a period from a starting-up of the power source to a predetermined time, larger than degrees of other periods. Therefore, large offset variations generated in a starting-up of the power source can be properly corrected so that the change in bearing can be accurately detected.

Namely, according to the invention, adjustment of the offset value that is large in variation can be properly effected, because the degree of the offset correction is made large at the starting-up of the power source. After the period from the starting-up of the power source to the predetermined time has elapsed, the offset correction degree becomes smaller than the offset correction degree immediately after the power source has started-up. The variation of the offset value caused by the excessive correction in the range where the offset value is less in variation can thus be prevented.

Also, the invention is characterized in that the offset correcting means can make the degree of offset correction large referring to the clocking means when the predetermined period has elapsed after the previous offset correction.

According to the invention, the offset correcting means can make the offset correction degree large when the predetermined period has elapsed from the previous offset correction. In the case where the time which elapsed from the previous offset correction becomes longer while the condition for offset correction being not satisfied, it is supposed that the offset largely deviates due to an increased temperature caused by continuous running. In this case, a proper correction can be carried out by making the degree of the offset correction large.

Namely, according to the invention, a proper correction can be effected with the effective use of the change of the offset correction by making the degree of the offset correction large when the interval of the offset correction becomes large with the condition of the offset correction being unsatisfactory for long hours.

Also, the invention is characterized in that the offset correcting means effects the offset correction by multiplying the offset correction value from the correction value calculating means by a weight coefficient and adjusting the degree of offset correction by changing the weight coefficient.

According to the invention, the offset correcting means corrects the output from the gyro sensor by multiplying the correction value from the correction value calculating means by the weight coefficient. The degree of the offset correction can be easily changed according to the various conditions because the degree of the correction can be adjusted by changing the value of the weight coefficient.

Namely, according to the invention, since the degree of the offset correction is changed by adjusting the weight coefficient for the offset correction value, adjustment of a degree for the proper correction can be easily executed.

BRIEF DESCRIPTION OF THE DRAWINGS

FIG. 1 is a block diagram showing a schematic electric construction of a first embodiment of the present invention.

FIG. 8 is a block diagram showing a schematic electric construction of a navigation system of a third embodiment of the invention.

FIG. 10 is a block diagram showing a schematic electric construction of a navigation system in a fourth embodiment of the invention.

FIG. 15 is a block diagram showing a schematic functional construction of the prior art navigation system.

DETAILED DESCRIPTION OF THE PREFERRED EMBODIMENTS

Figure 2A:
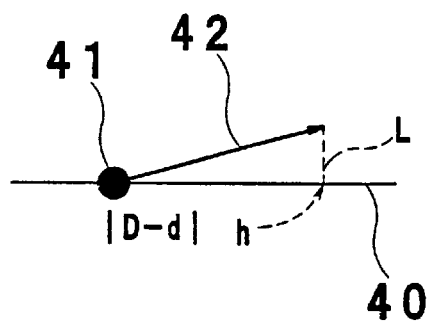
FIG. 2A is a view showing a basic idea of a degree of similarity operation by a map match processing portion 34 of FIG. 1.

FIG. 1 shows a schematic electric construction of a navigation system of a first embodiment of the invention. The navigation system 21 comprises a processing apparatus 22, a sensor 23, a storage apparatus 24, a display 25 and so on. In the processing apparatus 22 are included a CPU, a main memory and the like.

The sensor 23 includes a bearing sensor 30 realized by a vibration gyro and the like, a distance sensor 31 for calculating a running distance on the basis of a vehicle speed pulse or the like, a GPS apparatus 32 for detecting a present position and a progressive direction as an absolute bearing by receiving a GPS electric wave. Signals from the sensor 23 are processed by a sensor signal processing portion 33 realized by a program operation of the CPU so that signals representing a moving amount and a moving bearing of the vehicle are given to a map match processing portion 34 which is realized by the program operation of the CPU. The map match processing portion 34 reads road data 35 stored in a CD-ROM or the like in the storage apparatus 24 through a road data reading portion 36 to presume the vehicle position on the road for displaying on the display 25.

The CPU further forms a track calculating portion 37 which is a history calculating means, a position correcting portion 38 which is a position correcting means, and a bearing correcting portion 39 which is a bearing correcting means, by program operations thereof. The track calculating portion 37 sequentially memorizes a bearing detected by the bearing sensor 30 and a running distance from the distance sensor 31 to calculate a running history representing a moving amount and a moving bearing of the vehicle, and a running track as a shape of the running history. The position correcting portion 38 corrects the vehicle position onto a road where the vehicle is presumed by the map match processing portion 34 to be located. The bearing correcting portion 39 refers to the link bearing of the road to which the vehicle position is corrected by the map match processing portion 34 to correct the vehicle bearing showing the progressive direction of the vehicle. But the vehicle bearing is not corrected when a bearing difference condition to be described later is established.

Figure 2B:
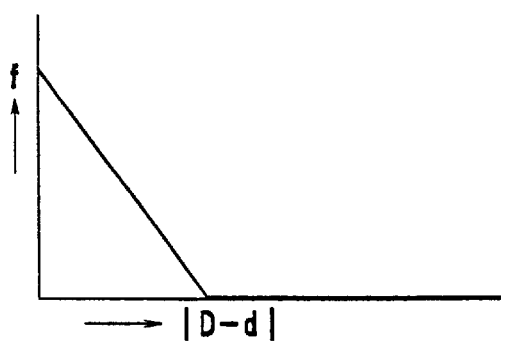
FIG. 2B is a graph showing the relationship between the absolute value of a bearing difference and a bearing similarity degree f in the degree of similarity operation by the map match processing portion 34 of FIG. 1.
Figure 2C:
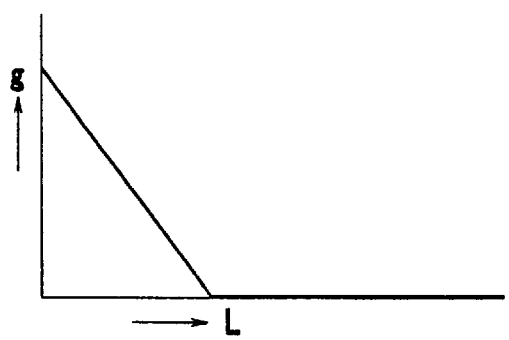
FIG. 2C is a graph showing the relationship between distance L and distance of the degree or similarity g in the degree of similarity operation by the map match processing portion 34 of FIG. 1.

FIG. 2A, together with FIG. 2B and FIG. 2C, shows a basic idea of the degree of similarity operation which is used in the map match processing by the map match processing portion 34 of FIG. 1. As shown in FIG. 2A, judgments for road data 40, whether or not a neighboring vehicle position 41 exists at a position h on the road, is effected by a calculation using the similarity based on a distance L to the road from a vehicle position 41 and a similarity based on the absolute value of a difference between a bearing d represented by a progress direction 42 of the vehicle and a bearing D of the road represented by the road data 40. FIG. 2B shows the relationship between the absolute value of a bearing difference and a bearing similarity degree f, and FIG. 2C shows the relationship between the distance L and a distance similarity degree g. A similarity degree E is calculated by such weight calculation as shown in the following Equation (1) using the bearing similarity f and the distance similarity degree g obtained in the above mentioned manner, together with the use of a predetermined weight coefficient F.

$$E = F \times f + G \times g \tag{1}$$

Figure 3:
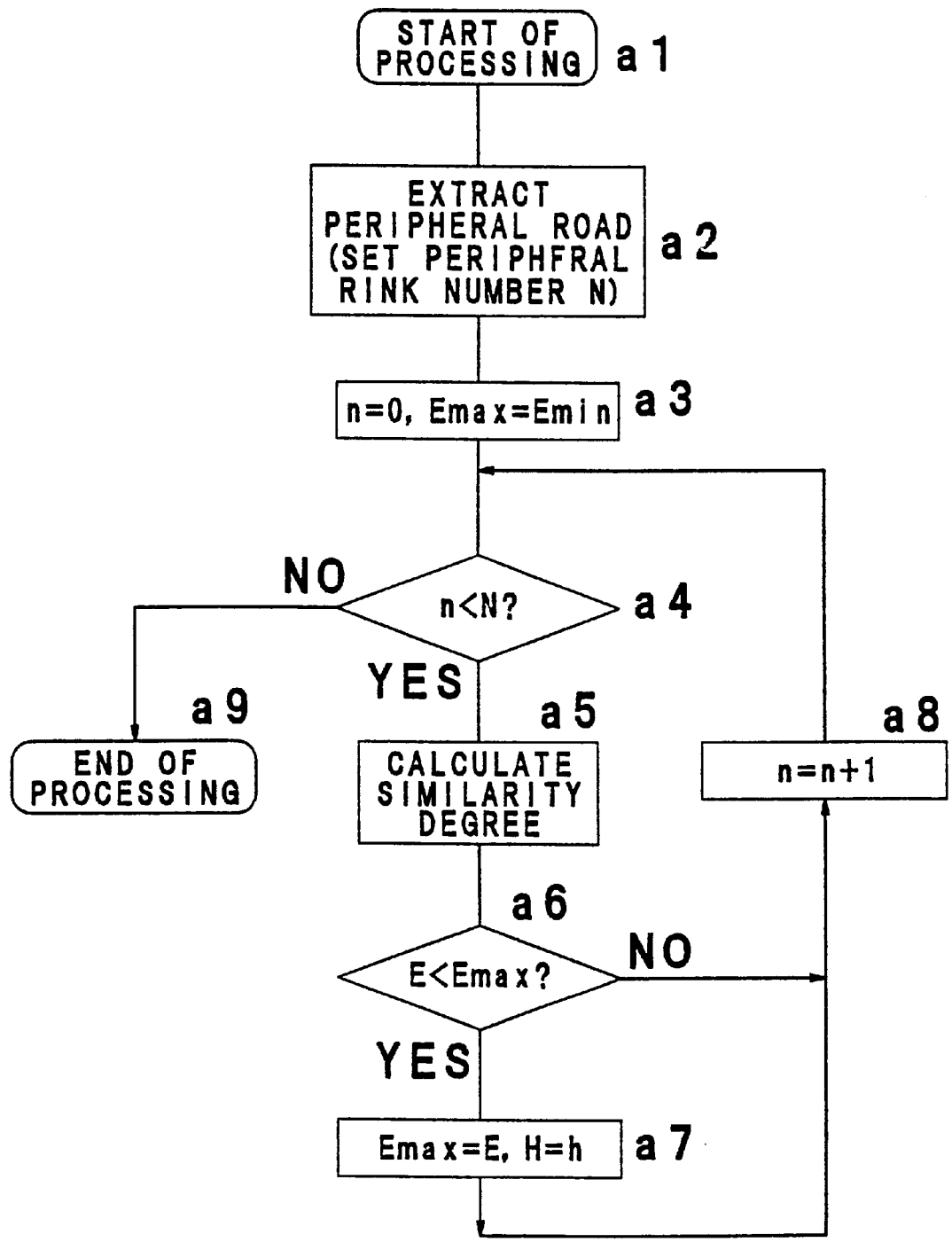
FIG. 3 is a flow chart showing the position correction processing by a position correcting portion 38 of FIG. 1.

FIG. 3 shows the processing of correcting a vehicle position H into the position h on a road where the similarity degree E is highest by calculating the similarity with respect to roads near and around the vehicle. The processing starts from step a1 and an extraction of the neighboring roads is carried out at step a2. The link number N to be considered for objects in the neighboring roads is set by an extraction of the neighboring roads. At step a3 a parameter n and a similarity $E_{max}$ are initialized to 0 and a minimum value $E_{min}$ of the similarity degree E, respectively. When the parameter n is judged as being larger than N at step a4, the similarity degree is calculated at step a5 to judge whether or not a value of E is larger than $E_{max}$, at step a6. When the value of E is determined large, E is substituted for $E_{max}$ at step a7 to correct the vehicle position H into h. Then, the parameter n is incremented by 1 at step a8 to return to step a4. When the value of n is judged as not being smaller than N at step a4, the processing ends at step a9.

Figure 4:
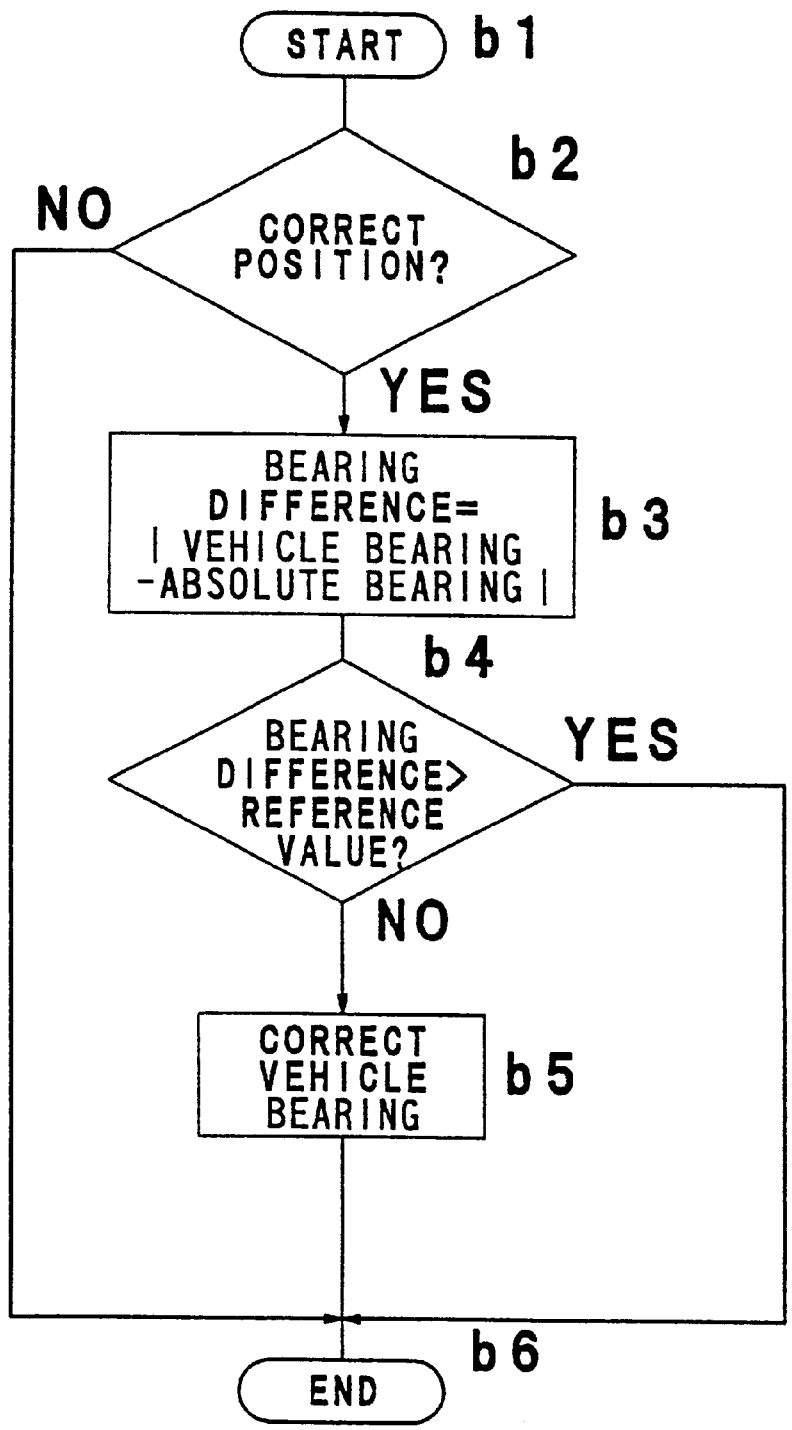
FIG. 4 is a flow chart showing an operation of a bearing correcting portion 39 of FIG. 1.

FIG. 4 shows an operation of the bearing correcting portion 39 of FIG. 1. The operation starts from step b1, and at step b2 it is judged whether or not the position correction into the road through the map match processing has been effected by the position correcting portion 38. When judged that the correction has been effected, the step proceeds to step b3 to calculate the absolute value of the bearing difference between the vehicle bearing and the link bearing of the roads which have been map-matched. Whether or not the bearing difference is larger than a reference value is judged at step b4. For example, 300 is used as the reference value. When the bearing difference is not larger than the reference value, the vehicle bearing correction to correct the vehicle bearing into the link bearing is effected at step b5. The operation ends at step b6 when it is judged that the position correction has not been effected at step b2, when it is judged that the bearing difference is larger than the reference value at step b4, and when the vehicle bearing correction has been completed at step b5.

Figure 5:
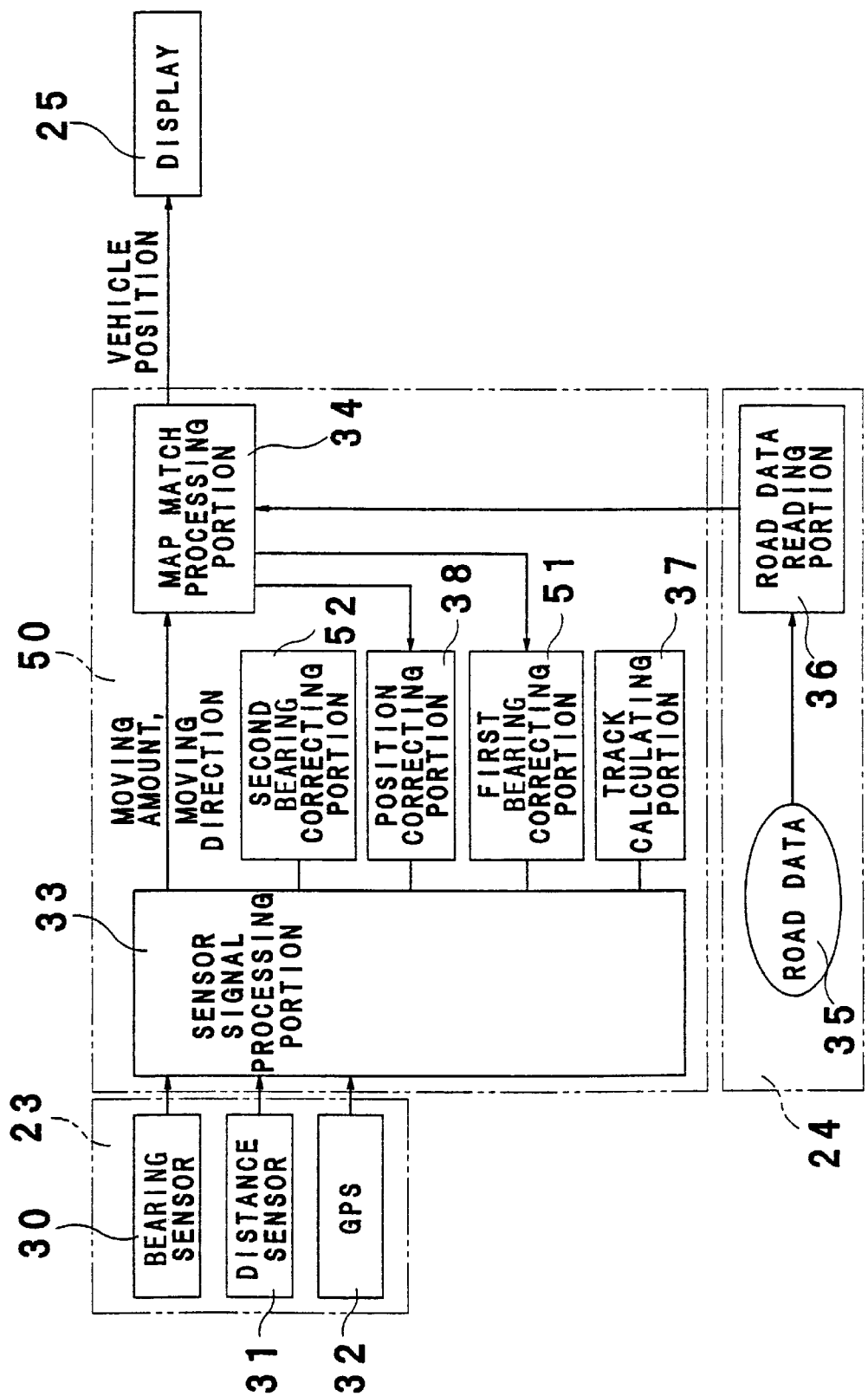
FIG. 5 is a block diagram showing a schematic electric construction of a navigation system of a second embodiment of the invention.

FIG. 5 shows the electric construction of a navigation system of a second embodiment of the invention. In the present embodiment, the same reference numerals are given to the parts corresponding to those in the embodiment of FIG. 1, the description thereof is omitted. A processing apparatus 50 includes a first bearing correcting portion 51 and a second bearing correcting portion 52 as a bearing correcting means. The first bearing correcting portion 51 corrects the vehicle bearing with the use of the link bearing of the road of the matching performed by the map match processing portion 34. The second bearing correcting portion 52 corrects the vehicle bearing using the absolute bearing inputted from a GPS apparatus 32 as an absolute bearing detecting means.

Figure 6:
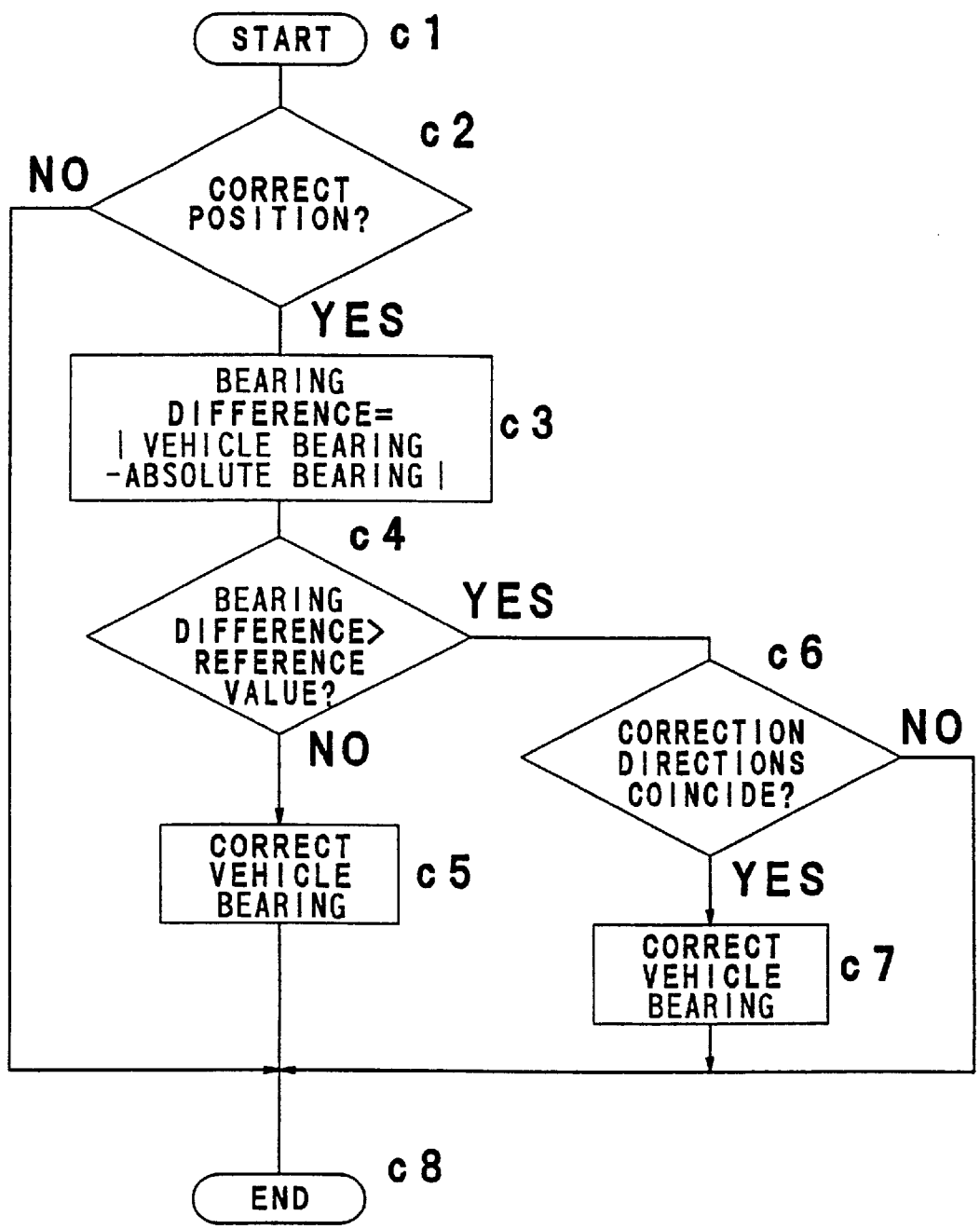
FIG. 6 is a flow chart showing an operation of a processing apparatus 50 of FIG. 5.

FIG. 6 shows an operation of the processing apparatus 50 of FIG. 5. The operation starts from step c1, and at step c2 it is judged whether or not the position correction by the position bearing portion 38 has been effected. When the position correction is effected, the absolute value of a difference between the vehicle bearing and the absolute bearing is calculated as the bearing difference at step c3.

At step c4, it is judged whether or not the bearing difference is larger than the reference value at step c4. The vehicle bearing is corrected into the link bearing at step c5 when the bearing difference is judged as not being larger than the reference value. When the bearing difference is judged as being larger than the reference value at step c4, the step proceeds to step c6 to judge whether or not bearings of the correction bearings by the first bearing correcting portion 51 and by the second bearing correcting portion 52 coincide. If it is judged that they coincide, the vehicle bearing is corrected into the closer bearing between the two bearings at step c7. The operation ends at step c8 when it is judged at step c2 that the position correction is not effected, when it is judged at step c6 that the correction bearings do not coincide, or when the processing at step c5 or at step c7 has ended. It is possible not to effect the vehicle bearing correction when the bearing difference is judged as being larger than the reference value at step c4 as in the operation shown in FIG. 4.

Figure 7:
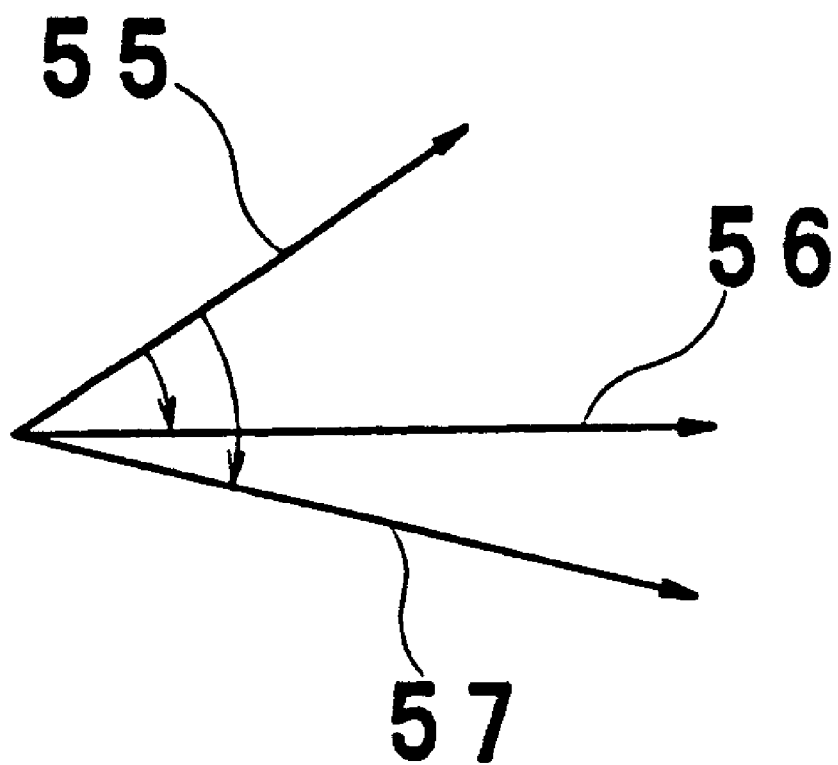
FIG. 7 is a view showing effects by the operation of FIG. 6.

FIG. 7 shows a reason for correcting the vehicle bearing when the correcting bearings coincide at step c6 and step c7 of FIG. 6. A link bearing 56 and an absolute bearing 57 are the same with respect to a vehicle bearing 55. The bearing difference between the vehicle bearing 55 and the link bearing 56 or the absolute bearing 57 is larger than the reference value, and the error of the vehicle bearing 55 is large. There is a large possibility of obtaining a more correct vehicle bearing by the correction into the link bearing 56 which is closer to the vehicle bearing 55, for example, because there is a large possibility that a more accurate vehicle bearing exists on the side of the link bearing 56 and the absolute bearing 57.

FIG. 8 shows the electric construction of a navigation system of a third embodiment of the invention. In the embodiment, the same reference numerals are given to the portions corresponding to those of the embodiment of FIG. 1, and thus description thereof is omitted. A processing apparatus 60 comprises a correction bearing calculating portion 61 which calculates the correction bearing to which the bearing detected by the bearing sensor 30 in straight advancing is to be corrected. The detection bearing from the bearing sensor 30 is calculated with the track calculating portion 37 including the history storage means, and the correction bearing is separately calculated by the correction bearing calculation portion 61 which is the correction bearing calculating means. The vehicle bearing is thus calculated by adding both the calculation results.

Figure 9A:
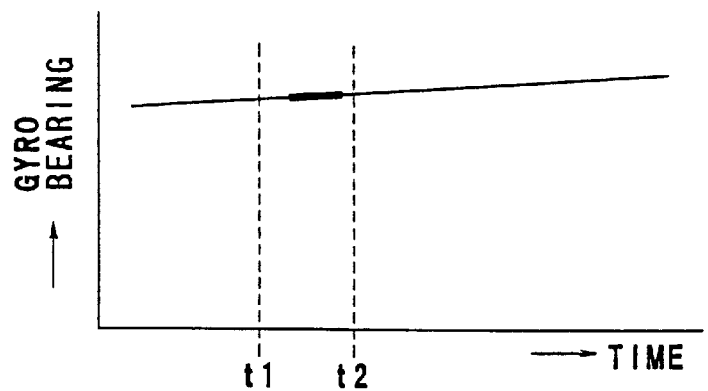
FIG. 9A is a graph showing changes in the gyro bearing according to time among operation results by the embodiment of FIG. 8.
Figure 9B:
FIG. 9B is a graph showing changes in the correction bearing according to time among the operation results by the embodiment of FIG. 8.
Figure 9C:
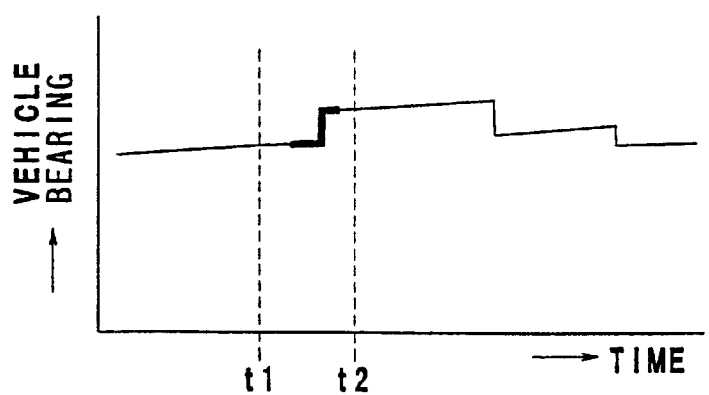
FIG. 9C is a graph showing changes in vehicle bearing derived by adding the gyro bearing and the correction bearing according to time among the operation results by the embodiment of FIG. 8.

FIG. 9A shows changes in a gyro bearing with time, wherein the gyro bearing is the detection bearing of the bearing sensor 30 calculated by the track calculating portion 37. FIG. 9B shows changes in the correction bearing with time, wherein the correction bearing is calculated by the correction bearing calculating portion 61. FIG. 9C shows changes in vehicle bearing with time, wherein the vehicle bearing is obtained by adding both of the above-discussed bearings. The correction bearing largely changes when the road of the map matching changes even in a range such as a range between time t1 and time t2 where the output of the bearing sensor 30 is stable as shown by the bold line in FIG. 9A. For such reason, the vehicle bearing also changes.

Therefore, it is preferable that the straight advance judging means directly monitors the bearing of the bearing sensor 30 in the case where the straight judging means is provided to judge whether or not the movement is a straight advance, and thus erroneous judgments can be prevented.

FIG. 10 shows the electric construction of a navigation system of a fourth embodiment of the invention. In the embodiment, the same reference numerals are given to the parts corresponding to those in the embodiment of FIG. 1, the description thereof is omitted. A processing apparatus 70, including an average calculating portion 71, calculates an average value while sampling the vehicle bearing and the absolute bearing for a certain period, respectively. A first period for averaging the absolute bearing, and a second period for averaging the vehicle bearing can be set to four seconds, for example. Eight absolute bearings can be averaged because the detection of the absolute bearings is effected, for example, once per 0.5 seconds. The second period can be further shortened because the detection of the vehicle bearing can be effected several ten times per second. Noise influences can be avoided by executing the average calculation so that the increase in error can also be prevented.

Figure 11:
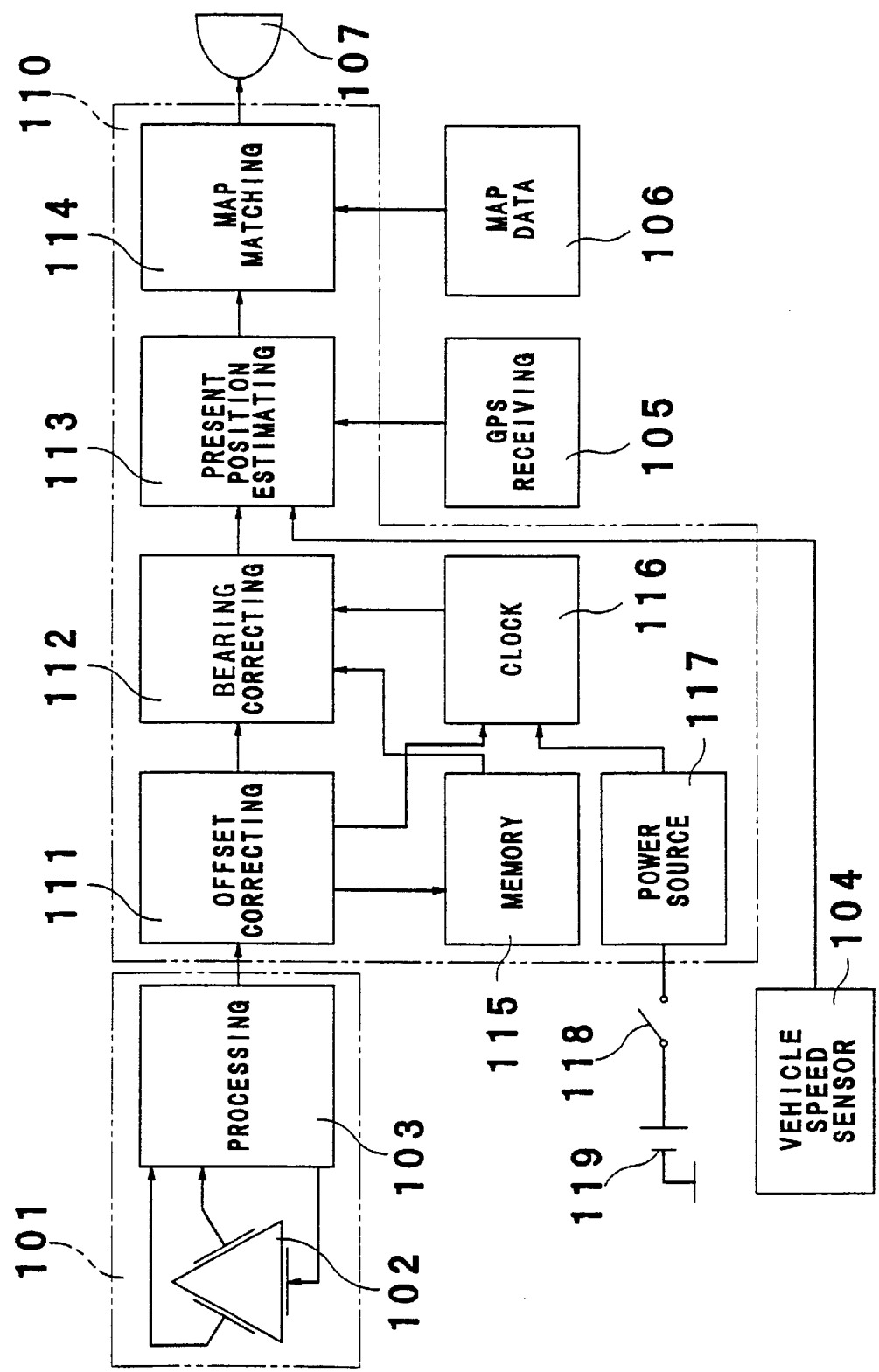
FIG. 11 is a block diagram showing a schematic electric construction of a fifth embodiment of the invention.

FIG. 11 shows a schematic electric construction of a navigation system including a gyroscopic device of a fifth embodiment of the invention. The gyro sensor 101 includes a vibration gyro 102 and an electric processing circuit 103 for the processing. The vibration gyro 102, mounted on the vehicle, detects changes in the bearing accompanied by changes in the progress direction of the vehicle. The vibration gyro 102 receives the Coriolis force accompanied by changes in the progress direction of the vehicle and the vibration component changes corresponding to the bearing. The change in the vibration component corresponding to the change in bearing is electrically detected by the processing circuit 103 to generate electric outputs corresponding to the change in the bearing. The running speed of the vehicle is detected by a vehicle speed sensor 104. The absolute position of the vehicle and the absolute bearing of the progress direction can be detected by a GPS receiving apparatus 105. Also, information about a road on which the vehicle is running is stored in a recording medium such as a CD-ROM provided within a map data storage apparatus 106. A present position of the vehicle is displayed on a display apparatus 107 in connection with map data of the map data storage apparatus 106.

The processing apparatus 110 responds to input signals from the gyro sensor 101, the vehicle speed sensor 104, the GPS receiving apparatus 105, and the map data storage apparatus 106 to display the present position, guide of the driving route, and the like by the displaying apparatus 107. The processing apparatus 110 comprises offset correcting means 111, to which signals representing the bearings showing the progress direction from the gyro sensor 101 are inputted, by which the timing for the offset correction is detected and the correction value for the offset correction is calculated, bearing correcting means 112 for correcting the bearing with the use of the offset correction values, present position presuming means 113 for presuming the present position of the vehicle by the combined use of the corrected bearing and a symbol from the vehicle speed sensor 104 showing the running distance, and the absolute value from the GPS receiving apparatus, map matching means 114 for effecting the map matching of the present position presumed with respect to the road stored in the map data storage means 106, a memory 115 for storing the data for calculating the offset value from the output of the gyro sensor 101, a clock 116 for clocking the time corresponding to the interval of the offset correction, and a power source 117. When a power switch 118 is turned ON and a battery 119 mounted on the vehicle starts supplying the electric power, the power source 117 activates the clocking operation of the clock 116.

Figure 12:
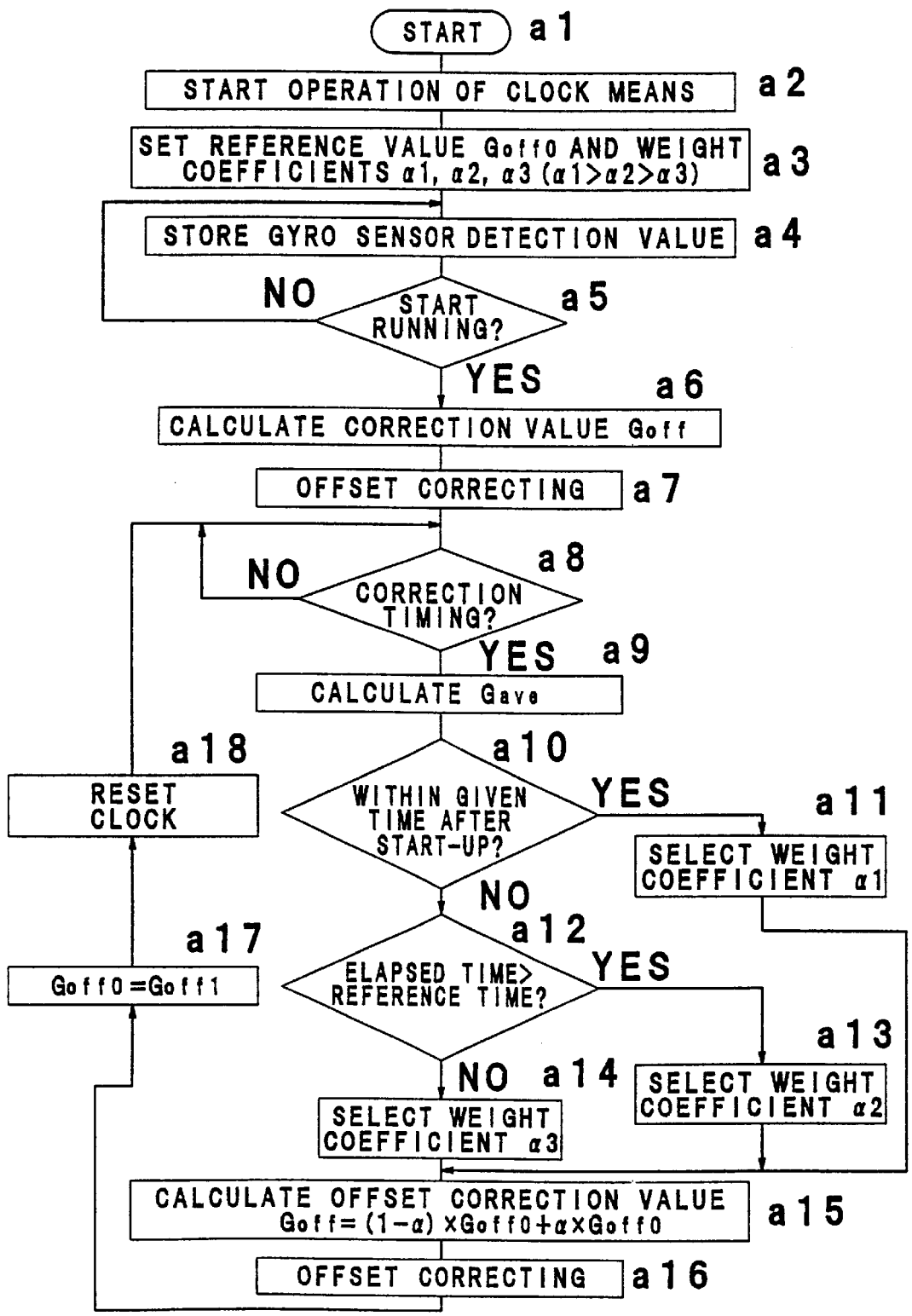
FIG. 12 is a flow chart showing an operation of a processing apparatus 10 of FIG. 11.

FIG. 12 shows the operation of the processing apparatus 110 of FIG. 11. When the power source switch 118 is switched on at step a1, the clocking operation by the clock 116 is started at step a2. At step a3, an offset reference value $G_{off0}$, and weight coefficients α 1, α 2, α 3 (α 1>α 2>α 3) corresponding to degrees of the correction are set. At step a4, the detection value of the bearing change portion is detected for each constant sampling cycle from the output of the gyro sensor 101 and is stored in the memory 115. At step a5, it is judged whether or not the running of the vehicle has been started. The step returns to step a4 when the vehicle has not started running and is stopping. Whether or not the vehicle has started running can be judged according to an output from the vehicle speed sensor 104. The relationship represented by the following Equation (2) is satisfied in the detection of the bearing using the gyro sensor 101, wherein $D_n$ is a bearing detected by the gyro sensor 101 at a time $T_n$, $G_n$ is an output value of the gyro sensor 101, $G_{off}$ is an offset correction value of the gyro sensor output, and K is a sensitivity coefficient of the gyro sensor 101.

$$D_n = K (G_n - G_{off}) + D_{n-1} \quad (2)$$

Here, $D_{n-1}$ represents the bearing at a time $T_{n-1}$ before a single sampling cycle. The offset of the gyro sensor 101 is generally determined by averaging the outputs of the gyro sensor 101 in the static condition. This is because a dispersion due to errors is caused in the static period although the output value $G_n$ is essentially expected to be constant. An average value Gave can be determined by the following Equation (3) when the number of data sampling during the static period is assumed to be N.

$$G_{ave} = \frac{1}{N} \sum_{i=0}^{N-1} G_i \quad (3)$$

Actually, an art of finding a proper weight and renewing it upon consideration of the dispersion etc. of the gyro sensor 101 is adopted. A new offset correction value $G_{off}$ of the gyro sensor 101 is calculated as in the following Equation (4), on the basis of the average value Gave of the gyro sensor 101 and the offset reference value $G_{off0}$ at that time.

$$G_{off} = (1-\alpha) G_{off0} + \alpha G_{ave} \quad (4)$$

The offset correction value $G_{off}$ is calculated in accordance with Equation (4) at step a6 when it is judged that the vehicle has started running at step a5. At step a7, a bearing Dn of Equation (1) is calculated with the use of the calculated offset correction value $G_{off}$ to effect the offset correction.

At step a8, it is judged whether or not the timing, when offset correction is possible, is reached again after the start of running of the vehicle. The offset correction in accordance with the present embodiment can be effected even in a condition where the progress direction of the vehicle is stable to a certain extent as well as in the static condition during the stop of the vehicle. The average value Gave is calculated in accordance with the above described third equation at step a9 when the correction timing is judged as being reached. Step a8 and step a9 correspond to the operations as the offset detecting means. At step a10, it is judged whether or not the correction timing is within the given time after the starting of the operation. The given time is, for example 30 minutes, and the largest value α 1 is selected as a weight coefficient a at step a11 when it has become the offset correction timing during this period. It is judged whether or not the lapse time from the previous offset correction exceeds the reference time at step a12 when it is judged that the timing is not within the given time after the start at step a10. The second largest value α 2 is selected as the weight coefficient a at step a13 when its is judged to exceed the reference time. The smallest value α 3 is selected as the weight coefficient a at step a14 when the lapse time is judged as being within the reference time at step a12. At step a3, the α 1 is set to, for example, about two times the α 3.

The offset correction value in accordance with Equation (4) is calculated at step a15 after completion of step a11, step a13 or step a14. Namely, steps a10 through steps a15 correspond to the operations as the correction value calculating means. Then, at step a16, the bearing $D_n$ having undergone the offset correction in accordance with Equation (2) is calculated with the use of the offset value calculated at step a5. At step a17, the offset correction value $G_{off}$ calculated at step a15 is assigned as the new offset reference value $G_{off0}$. Then, the clock 116 is reset at step a18 to return to step a8. The operations from step a9 through step a18 are repeated every time the timing of the offset correction is reached thereafter.

Figure 13:
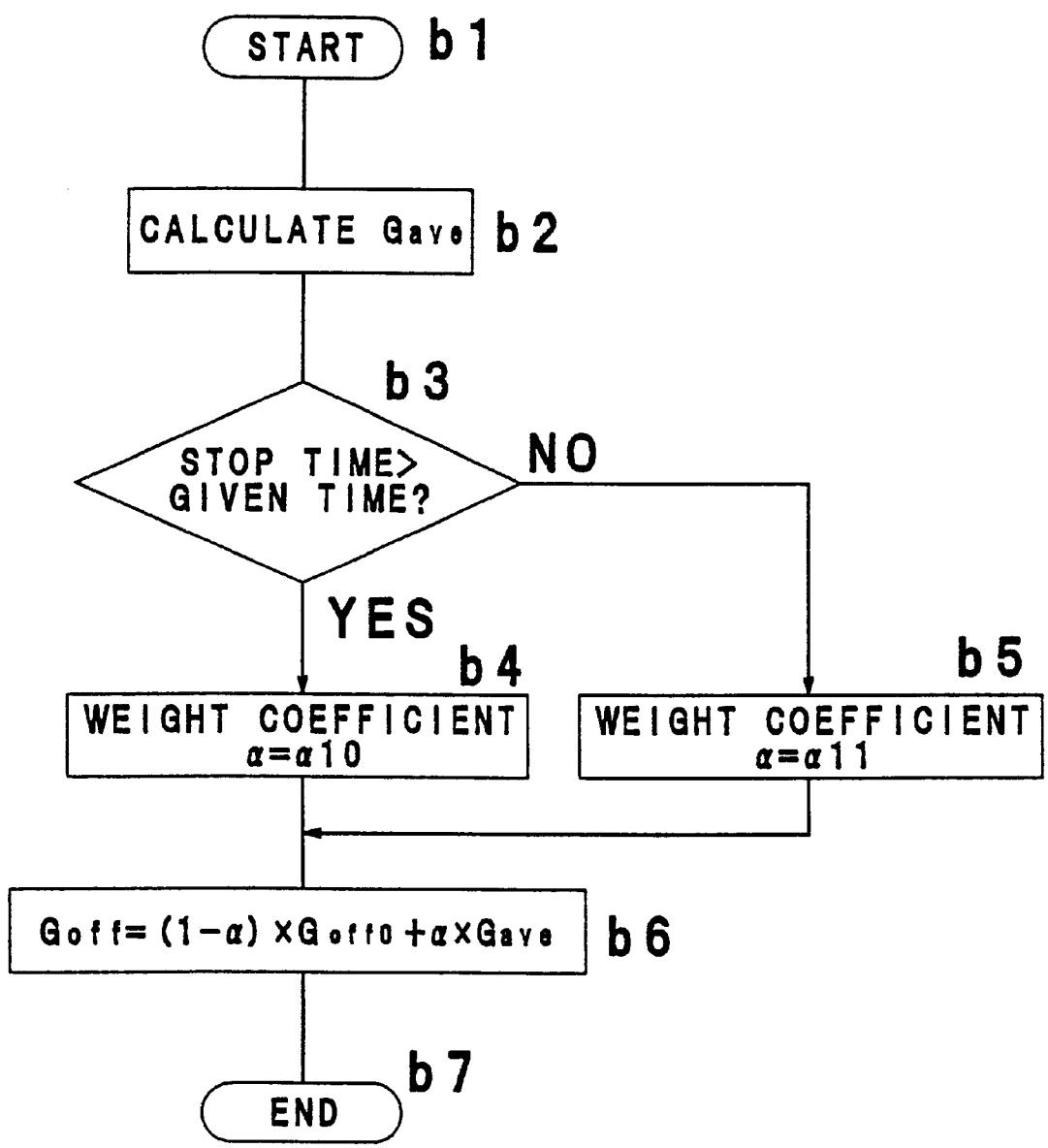
FIG. 13 is a flow chart showing an operation of the processing apparatus 10 of FIG. 11 in a sixth embodiment of the invention.
Figure 14:
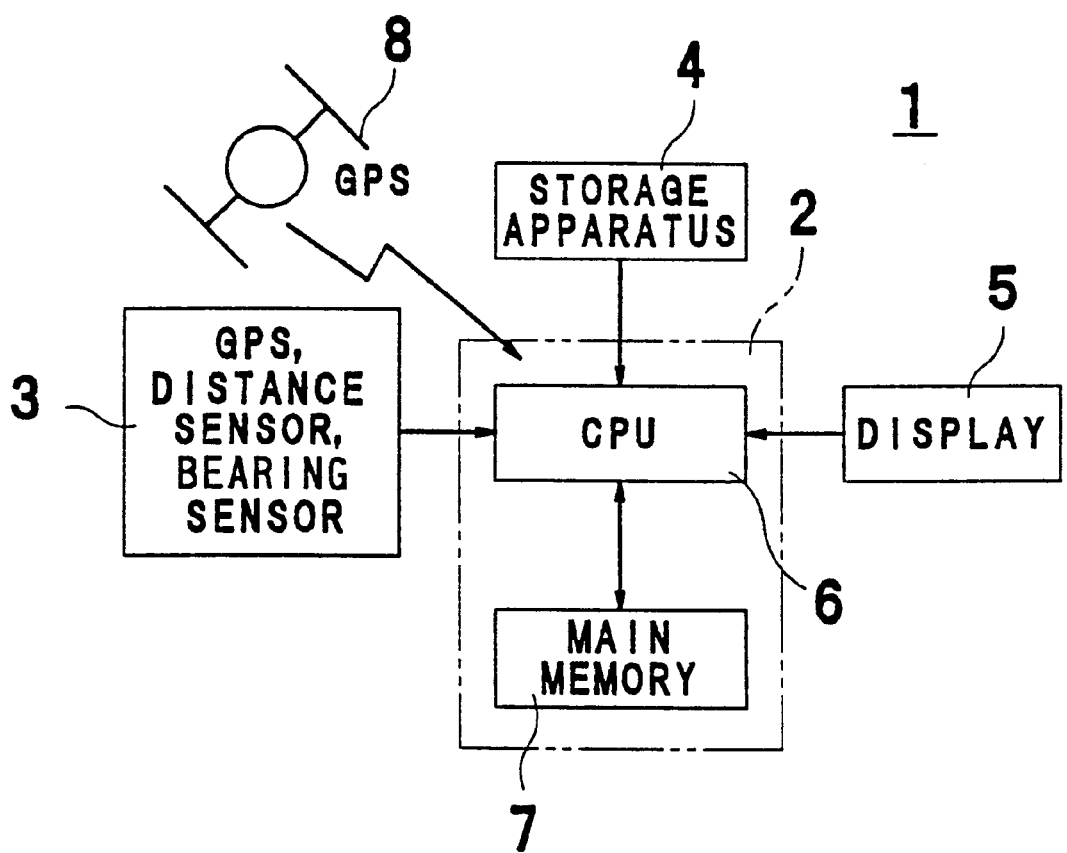
FIG. 14 is a block diagram showing a basic hardware construction of a prior art navigation system.

FIG. 13 shows an operation for changing the weight coefficient corresponding to the length of the stop time at step a6 of FIG. 12 in a sixth embodiment of the invention. The operation starts from step b1 to calculate the average value $G_{ave}$ of the gyro sensor output within the stop time at step b2 as in Equation (2). At step b3, it is judged whether or not the stop time exceeds the given time that is predetermined. The given time is normally set as the time presumed to elapse from the actuation of the vehicle to the actual start of the running. When the stop time exceeds the given time, the given value α 10 is set as the weight coefficient a at step b4. A value α 11 larger than the given value α 10 is set as the weight coefficient a at step b5 when the stop time is within the given time. The correction degree is made large when the stop time is short because the sequential offset variation is considered large with no sufficient idling operation and the like. After the setting of the weight coefficient α has completed at step b4 or step b5, the correction value $G_{off}$ is calculated in accordance with Equation (4) at step b6 to complete the operation at step b7.

The value of the weight coefficient a can also be adjusted in accordance with the conditions of judging whether or not it is the timing of the offset correction at step b8, although the value of the weight coefficient a is designed to be changed depending on whether or not the lapse time from the previous offset correction exceeds the reference time after the lapse of the given time after the start in the operation of FIG. 12. In the case where the straight advance section is short, for example, during running on the mountain road, however the engine output is large and the temperature rise around the vibration gyro 102 becomes large, a method wherein the conditions of offset correction are relaxed, and an increase in error per round is prevented by reducing the weight coefficient instead of increasing the frequency of the offset correction is preferable.

What is claimed is:

1. A navigation system mounted on a vehicle for presuming a vehicle position and a bearing indicating a progressive direction of the vehicle on the basis of a change in a running direction detected by a bearing detecting means and a running distance detected by a running distance detecting means, said navigation system comprising:

history calculating means for calculating a running history of the vehicle on the basis of the vehicle position and the bearing indicating the progressive direction of the vehicle;

position correcting means for calculating a similarity between the running history calculated by said history calculating means and predetermined road data by performing a comparison thereof, and for correcting the vehicle position on a road when the calculated similarity is greater than a predetermined large value; and bearing correcting means for correcting the bearing indicating the progressive direction of the vehicle to a bearing of the road on which the vehicle position is corrected by said position correcting means;

wherein the correction of the vehicle position by said position correcting means is performed, and the correction of the bearing indicating the progressive direction of the vehicle to the bearing of the road on which the vehicle position is corrected by said position correcting means is not performed, when a predetermined bearing difference condition is established.

2. A navigation system as claimed in claim 1, wherein said bearing correcting means establishes the predetermined bearing difference condition when a bearing difference between the bearing indicating the progressive direction of the vehicle and the bearing of the road becomes at least equal to a predetermined reference value.

3. A navigation system as claimed in claim 1, further comprising:

absolute bearing detecting means for detecting an absolute bearing indicating the progressive direction of the vehicle;

wherein said bearing correcting means further corrects the bearing indicating the progressive direction of the vehicle based on the absolute bearing detected by said absolute bearing detecting means, and the predetermined bearing difference condition is established when a bearing difference between the absolute bearing and the bearing of the road on which the vehicle position is corrected by said position correcting means becomes at least equal to a predetermined reference value.

4. A navigation system as claimed in claim 3, wherein, when a first correcting direction for the bearing of the road on which the vehicle position is corrected by said position correcting means and a second correcting direction for the bearing based on the absolute bearing detected by said absolute bearing detecting means coincide, said bearing correcting means corrects the bearing of the progressive direction of the vehicle on the basis of a first bearing correction value for the first correcting direction and a second bearing correction value for the second correcting direction even when the bearing difference between the absolute bearing detected by said absolute bearing detecting means and the bearing of the road on which the vehicle position is corrected by said position correcting means becomes at least equal to the predetermined reference value.

5. A navigation system as claimed in claim 1, further comprising:

absolute bearing detecting means for detecting an absolute bearing indicating the progressive direction of the vehicle;

wherein said bearing correcting means further corrects the bearing indicating the progressive direction of the vehicle based on the absolute bearing detected by said absolute bearing detecting means, and the predetermined bearing difference condition is established when a bearing difference between the absolute bearing and a presumed bearing indicating the progressive direction becomes at least equal to a predetermined reference value.

6. A navigation system mounted on a vehicle for presuming a vehicle position and a bearing indicating a progressive direction of the vehicle on the basis of a change in a running direction detected by a bearing detecting means and a running distance detected by a running distance detecting means, said navigation system comprising:

history storage means for sequentially storing the bearing indicating the progressive direction of the vehicle and storing a history of the bearing;

straight advance judging means for determining a straight advance when a change in bearing during a predetermined period is within a predetermined range with reference to said history storage means; and correction bearing calculating means for calculating a correction bearing, to which the bearing indicating the progressive direction of the vehicle is to be corrected, separately from a bearing showing a presumed progressive direction when the straight advance is determined by said straight advance judging means.

7. A navigation system as claimed in claim 6, wherein said straight advance judging means directly monitors the bearing of said bearing detecting means.

8. A navigation system mounted on a vehicle for presuming a vehicle position and a bearing indicating a progressive direction of the vehicle on the basis of a change in a running direction detected by a bearing detecting means and a running distance detected by a running distance detecting means, said navigation system comprising:

bearing correcting means for detecting an absolute bearing indicating the progressive direction of the vehicle, and for correcting the bearing indicating the progressive direction of the vehicle based on the detected absolute bearing;

wherein said bearing correcting means corrects the bearing indicating the progressive direction of the vehicle on the basis of a first average bearing of the absolute bearing about a predetermined first period, and a second average bearing of the bearing indicating the progressive direction of the vehicle about a predetermined second period, when correcting the bearing indicating the progressive direction of the vehicle on the basis of the detected absolute bearing.

9. A navigation system as claimed in claim 8, wherein the predetermined second period is shorter than the predetermined first period.

10. A gyroscopic device mounted on a vehicle for presuming a progressive direction of the vehicle during a running of the vehicle by detecting a change in a bearing representing the progressive direction of the vehicle by means of a gyro sensor, said gyroscopic device comprising:

clocking means for clocking an elapsed time;

offset detecting means for detecting offset components from an output of the gyro sensor under a predetermined condition where the progressive direction is judged as being stable;

correction value calculating means for calculating an offset correction value which is used for correcting the offset components detected by said offset detecting means; and offset correcting means for correcting the output from the gyro sensor using the offset correction value calculated by said correction value detecting means;

wherein said offset correcting means makes a degree of correction in a period from a starting-up of a power source to a predetermined time, which is larger than degrees of correction in other periods, by referring to said clocking means.

11. A gyroscopic device as claimed in claim 10, wherein said offset correcting means makes the degree of offset correction large, by referring to said clocking means, when the predetermined period has elapsed after the previous offset correction.

12. A gyroscopic device as claimed in claim 10, wherein said offset correcting means effects the offset correction by multiplying the offset correction value from said correction value calculating means by a weight coefficient and adjusts the degree of the offset correction by changing the weight coefficient.

\* \* \* \* \*